United States Patent [11] 3,568,159

[72] Inventor Ryo Igarashi
Tokyo, Japan
[21] Appl. No. 702,686
[22] Filed Feb. 2, 1968
[45] Patented Mar. 2, 1971
[73] Assignee Nippon Electric Company, Limited
Tokyo, Japan
[32] Priority Feb. 9, 1967
[33] Japan
[31] 42/8,499

[54] MULTIMATCH PROCESSING SYSTEM
16 Claims, 7 Drawing Figs.

[52] U.S. Cl. .......... 340/172.5
[51] Int. Cl. .......... G06f 15/00
[50] Field of Search .......... 340/172.5

[56] References Cited

UNITED STATES PATENTS

| | | | |
|---|---|---|---|
| 3,419,851 | 12/1968 | Burns | 340/172.5 |
| 3,402,394 | 9/1968 | Koerner et al. | 340/172.5 |
| 3,339,181 | 8/1967 | Singleton et al. | 340/172.5 |
| 3,290,661 | 12/1966 | Belcourt et al. | 340/172.5X |

*Primary Examiner*—Malcolm A. Morrison
*Assistant Examiner*—David H. Malzahn
*Attorney*—Marn & Jangarathis

ABSTRACT: A multimatch system for processing the results of the matching of memory signals, including an $m$-number of flip-flop circuits disposed in an $X$-direction and an $n$-number of flip-flop circuits positioned in a $Y$-direction to indicate such matches thereby enabling the system to process an $m \times n$ number of memory words. The system also contains corresponding $m$ and $n$ numbers of each of AND and OR gates arranged in the $X$ and $Y$ directions for use with the respective $m$ and $n$ numbers of $X$ and $Y$ direction flip-flop circuits.

INVENTOR.
Ryo Igarashi

BY
Marn & Jangarathis
ATTORNEYS

INVENTOR
Ryo Igarashi
BY
Marn & Jangarathis
ATTORNEYS

INVENTOR.
Ryo Igarashi
BY
Marn & Jangarathis
ATTORNEYS

INVENTOR.
Ryo Igarashi

BY
Marn & Jangarathis
ATTORNEYS

INVENTOR.
Ryo Igarashi
BY
Marn & Jangarathis
ATTORNEYS

MULTIMATCH PROCESSING SYSTEM

The present invention relates to a multimatch system for processing the results of matching memory signals, and more specifically, to such system including an improved arrangement for distributing the match signals into pluralities of at least first and second different groups of signal paths, each of the first signal path groups comprising a preselected number of signal paths coupled to a corresponding number of match signals and each of the second signal paths groups including each signal path connected to a corresponding signal path in a different one of the first signal path groups.

It is known to be advantageous in the prior art to read the stored contents of matched words by searching the selected portion of each word according to the stored contents thereof, but not according to an address, and by detecting words of which a selected portion matches a search signal from among a multitude of words. The stored contents of matched words are usually found in an associative memory. The comparisons between each selected portion of whole words and search signals are simultaneously carried out whereby match signals are simultaneously derived for words which match the search signals. In case two or more words in an associative memory match search signals, it is desirable to take out the stored contents of the words matching the search signals in sequence. Where there is a plurality of words, each of which consists of bits—in which selected bits match the search signal—the multimatch processing must be performed to read the stored contents of the respective words. In other words, when *m* match signals are obtained in *m* words, it is desirable to read *m* times repeatedly, and to read the information individually from the matched words.

Prior art processing systems of the foregoing kind are known to employ either a by-path shift register or a priority gate such, for example, as that described in Japanese Pat. No. 65-22211 which corresponds to U.S. Pat. No. 3,271,744, issued to H.E. Petersen and M. Teig on Sept. 6, 1966, or in the thesis of Proceedings-Spring Joint Computer Conference, page 381, 1963. (American Federation of Information Processing Societies, published by Spartan Book Company, Baltimore, Maryland, U.S.A. and Cleaver-Hume Press, London, England. In each prior art systems, it is necessary to provide a flip-flop for a multimatch processing of each word—or bit—of an associative memory. The by-path shift register of the Japanese Patent Publication, supra, includes both a flip-flop group for storing match signals and a separate flip-flop group, used for selection, in correspondence with the first-mentioned flip-flop group. When a read operation if performed in a state where the multimatches are stored in the flip-flop group used for storing match signals, the multimatch processing is carried out by placing the matched words in a selective state after the contents of the flip-flop in which the matched signals are stored—have been transferred to the selective—use flip-flops in a predetermined priority order.

The priority gate processing system as disclosed in the proceedings, supra, utilizes flip-flop for storing match signals in correspondence with the words of the associative memory, and the priority order is given to those flip-flops in advance. This order is determined by priority gates and the selective signals are fed, according to the priority order from the flip-flops in which match signals are stored, to the words which correspond with those flip-flops. The selection of the words which correspond to the flip-flops storing the match signals is concluded when the latter flip-flops are reset to the nonselective state.

The use of an increasing number of flip-flops in correspondence with an increasing number of words in the aforenoted by-path shift register processing system has been found to be economically undesirable. The uses of circuits for resetting the flip-flops and for providing the priority order which is complicated in design in the priority gate processing system have also been found to be economically undesirable.

The present invention therefore contemplates a multimatch processing system for matching the search signals of an of an associative memory by an improved arrangement distributing the match signals in pluralities of groups of signal transmission paths extending in different directions to enlarge the capability of the system to handle expeditiously increased numbers of memory search signals.

A principal object of the present invention is to provide an improved multimatch processing system for economically processing large numbers of matching memory words.

Another object is to simplify the operation of a multimatch processing system.

An additional object is to reduce the costs of manufacture and maintenance of a multimatch processing system.

A further object is to simplify the design of a multimatch processing system.

Still another object is to maintain a minimum number of system components in a multimatch processing system for for processing numbers of matching memory words.

A further object is to provide indications of the results of matching memory words.

Still an additional object is to provide a multimatch processing system requiring the addition of relatively small numbers of system components for relatively large increases in the number of memory words.

A still further object is to increase substantially the number of match signal transmission paths by use of a small number of components in a multimatch processing system.

Another object is to provide *m* groups of first match signal paths and *n* groups of second match signal paths for *mxn* memory signals where *m* is a whole number of the groups of first match signals and *n* is a whole number of the groups of second match signal paths.

An additional object is to enlarge the capability of a multimatch processing system for handling increased numbers of memory search signals.

In association with a signal memory providing a predetermined number of search signals, a specific embodiment of the present invention comprises a signal distributor including a plurality of input terminals, each receiving one of the memory search signals; a plurality of first AND gates, each having a plurality of inputs and one output, one input of each first AND gate connected to one of the input terminals, the outputs of the first AND gates arranged in a first predetermined number of groups of first signal transmission paths and a second predetermined number of groups of second signal transmission paths, each of the first path groups having a preselected number of paths connected to a corresponding number of first AND gate outputs and each of the second path groups having a number of paths equal to the preselected number of signal paths in each of the first signal path groups, each of the second path groups having each signal path connected to a corresponding signal path in a different one of the first signal path groups; a plurality of first OR gates, each having an output and a plurality of inputs connected to one of the first path groups; a plurality of second AND gates, each having an output and two inputs of which one is connected to the output of one of the first OR gates; a plurality of second OR gates, each having an output and a plurality of inputs, each input connected to a corresponding path in each of the second path groups; a plurality of third AND gates, each having an output and two inputs of which one is connected to the output of one of the second OR gates; the number of input terminals available for receiving a corresponding number of memory search signals being equal to the product of the of the first predetermined number of first signal groups multiplied by the second predetermined number of second signal groups; first logic means including a plurality of first flip-flop circuits and connecting the second AND gate outputs to the second inputs of first AND gates included in different groups thereof; and second logic means including a plurality of second flip-flop circuits and connecting the third AND gate outputs to third inputs of first AND gates included in further different groups thereof, the output of each first AND gate of each of the further groups thereof connected to a corresponding input of each of the second OR gates.

In the operation of the invention and in the normal state of the system before the application of memory search signals, all distributor input terminals are provided with match signals. When a search operation is instituted in the memory, match signals which match the search signals are retained at the corresponding distributor input terminals while the remaining distributor input terminals are placed in a nonmatch state. The memory supplies control signals to institute a match search in the first signal paths so that when a match is achieved, a signal so indicating is stored in one of the first flip-flop circuits. Then, the search is instituted in the second signal path groups until a match is found therein. This is stored in one of the second flip-flop circuits. After the match of the first signal path group is selected, the particular flip-flop circuit storing the latter indication is activated to a nonindicating state. Similarly, after the match of the second signal path is selected, the particular flip-flop circuit storing the latter indication is activated to a nonindicating state. Thus, the first and second signal path groups are searched in sequence for signal-match indications. When the search operation is concluded, all distributor input terminals are restored to a match state in response to the establishment of a similar state in the memory. Thus, the match signals are recorded in the respective flip-flop circuits in accordance with the occurrences and positions of the match signals in the memory search signals.

A feature of the invention is that the number of flip-flop circuits required is less than the number of memory words to be matched. Thus, if *m* flip-flop circuits are required for the first signal path groups and *n* flip-flop circuits are required for the second signal path groups, then the system herein is capable of handling *mxn* search words supplied by the memory. Accordingly, as the number of memory search words becomes large, the ratio between the number of flip-flop circuits available for multimatch processing and the number of such words can be made small. Another feature is that a circuit of simple design is required to establish priority between the pluralities of the first and second flip-flop circuits for the selection of the match signals.

The invention is readily understood from the following description when taken together with the accompanying drawing in which.

Figure 7:
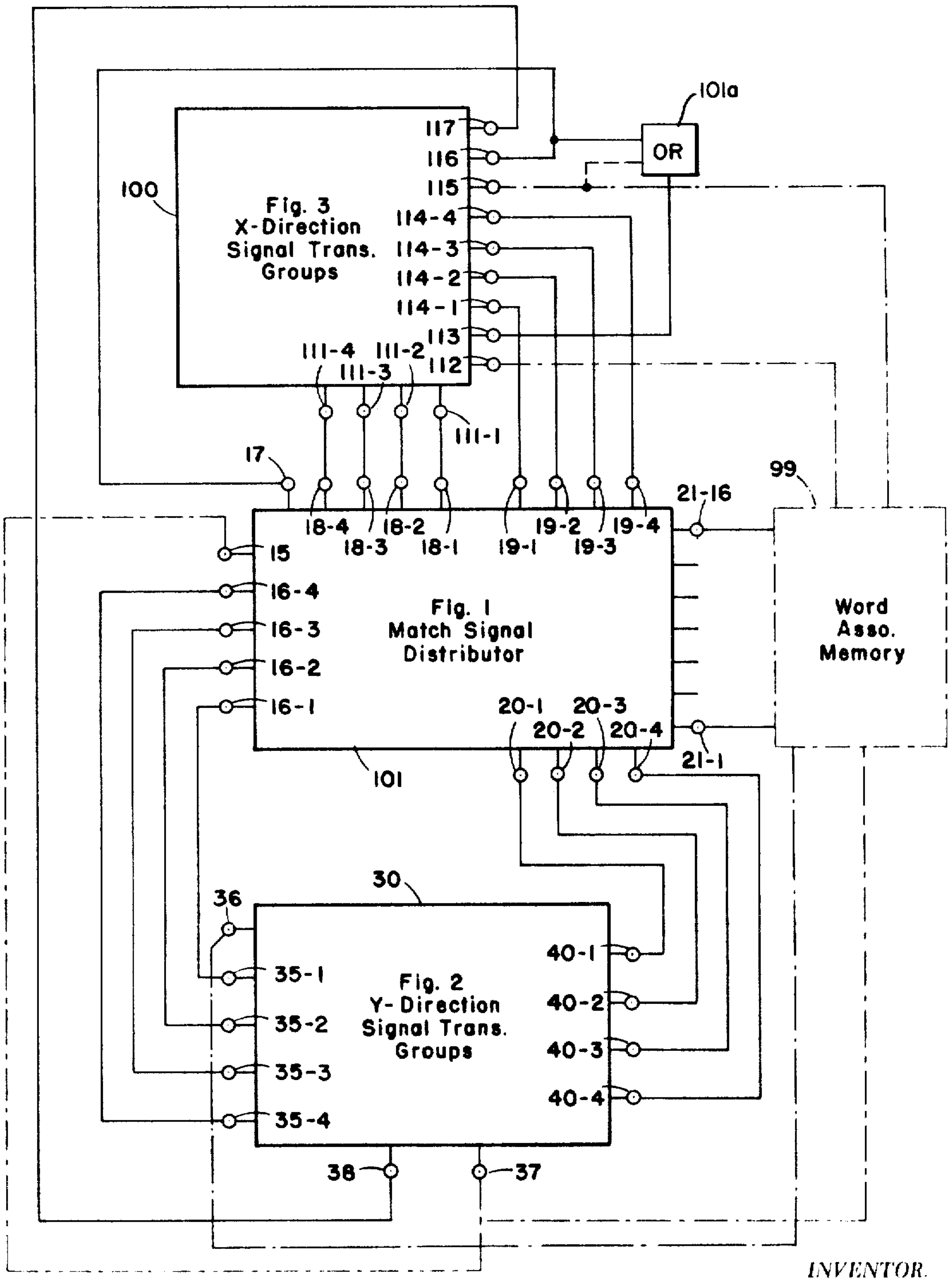
FIG. 7 is a box diagram of a specific embodiment of the invention including FIGS. 1, 2 and 3.

FIG. 7 shows an associative memory 99 having search words to be matched connected to input terminals 21-1...21-16 of a match signal distributor 101 which transmits match signals into *Y* direction and an *X* direction logic processing circuits 30 and 100, respectively, for processing the match signals in sequence via the latter circuits in a manner that is hereinafter explained.

Figure 1:
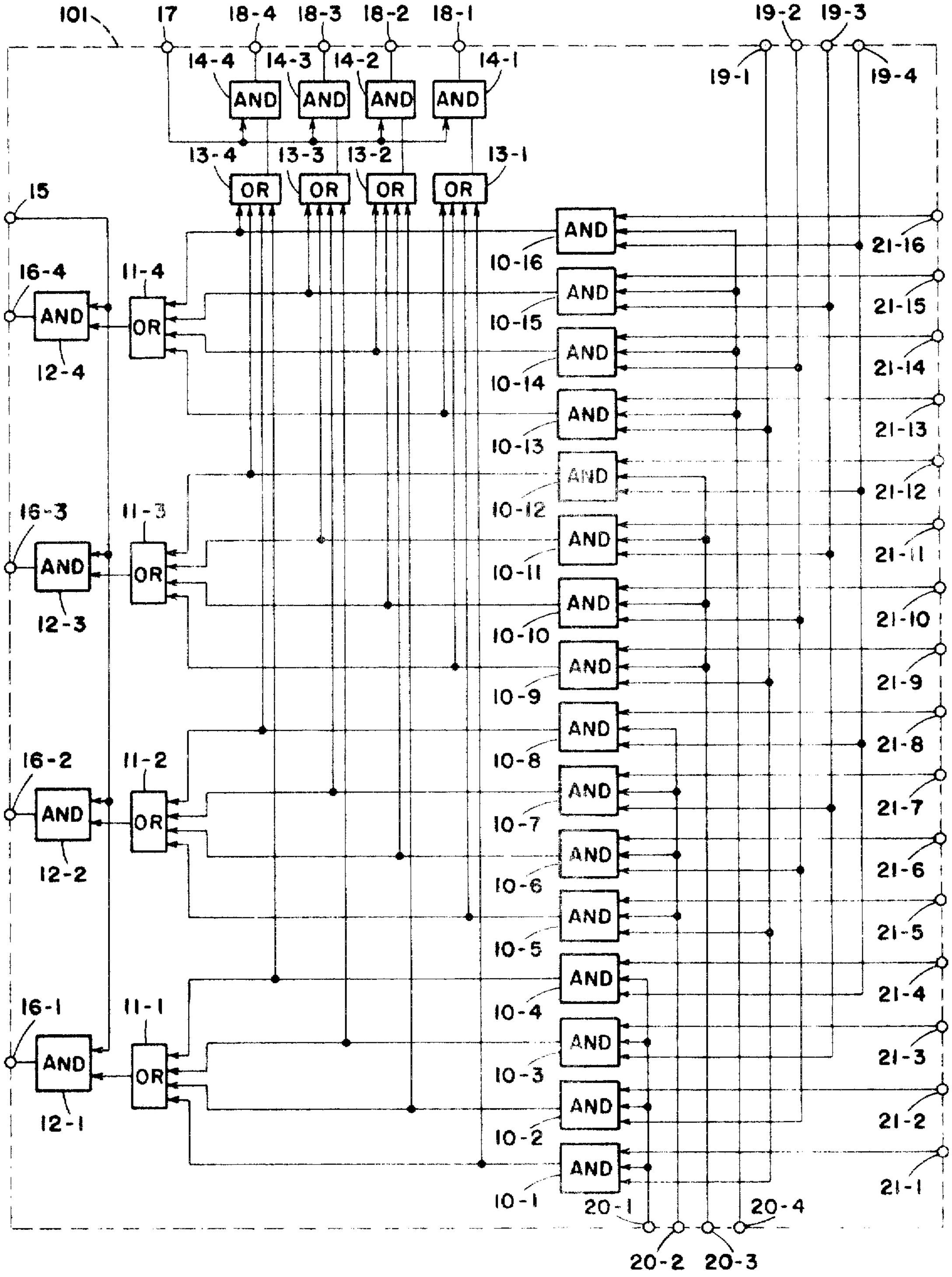
FIG. 1 is a box diagram of a logic signal match distributor.

FIG. 1 shows a match signal distributor 101 conforming with the principle of the present invention for distributing match signals in *X* and *Y* directions and comprising AND gates 10's (10-1...10-16) for receiving match signals from the associative memory, OR gates 11—s (11-1...11-4) for distributing match signals in the *Y* direction, OR gates 13's (13-1...13-4) for distributing match signals in the *X* direction, AND gates 14's (14-1...14-4) for sampling the match signals distributed in the *X* direction by an *X* set pulse applied to terminal 17, AND gates 12's (12-1...12-4) for sampling the match signals distributed in the *Y* direction by a *Y* set pulse applied to terminal 15, output terminals 18's (18-1...18-4) respectively connected with the outputs of the AND gates 14's, output terminals 16's (16-1...16-4) respectively connected with the outputs of the AND gates 12's, terminals 21's (21-1...21-16) for applying match signals, and terminals 19's (19-1...19-4) and 20's (20-1...20-4) for applying control signals to the AND gates 10's.

Figure 2:
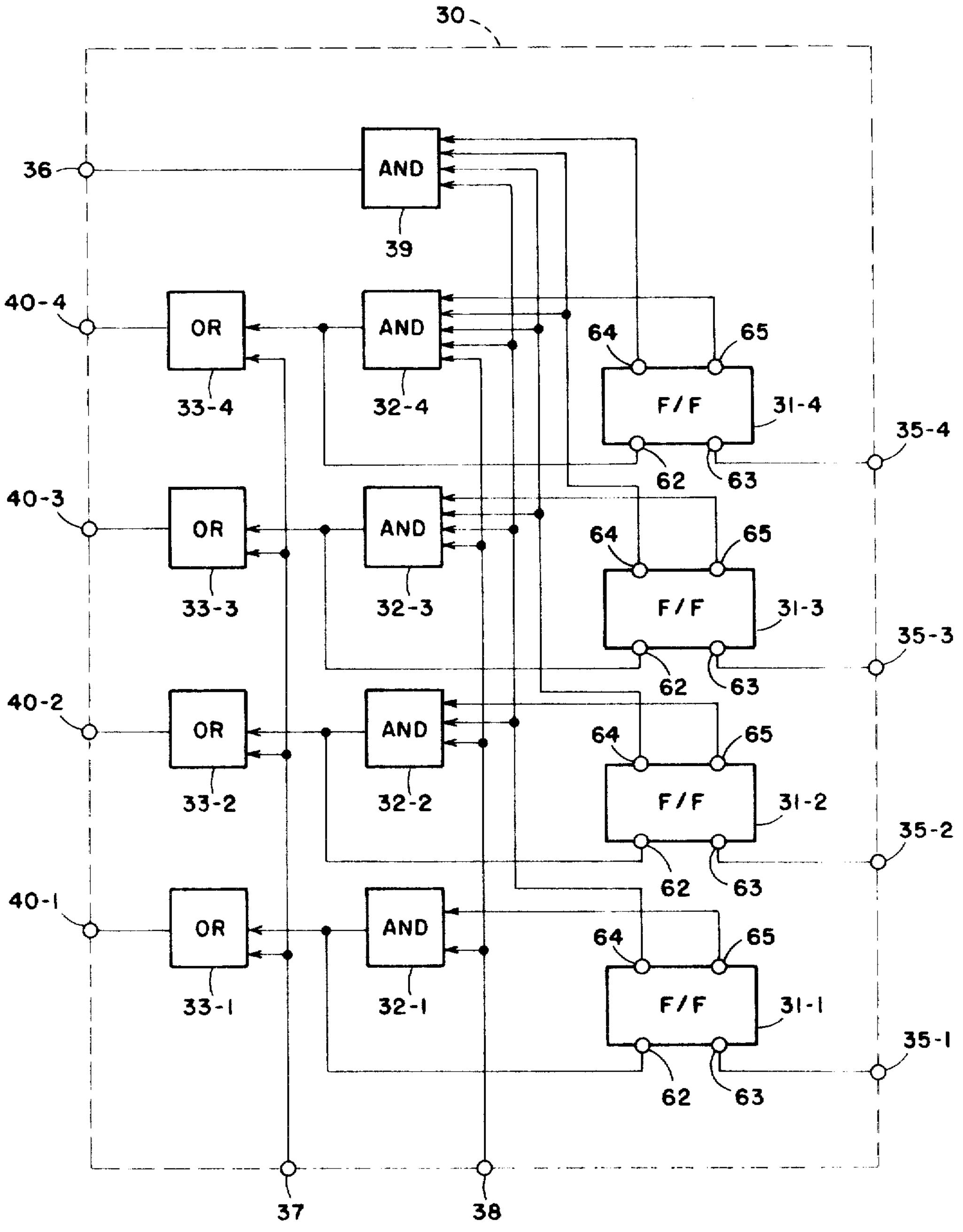
FIG. 2 is a box diagram of a logic circuit usable with FIG. 1 for processing match signals in a first given direction.
Figure 3:
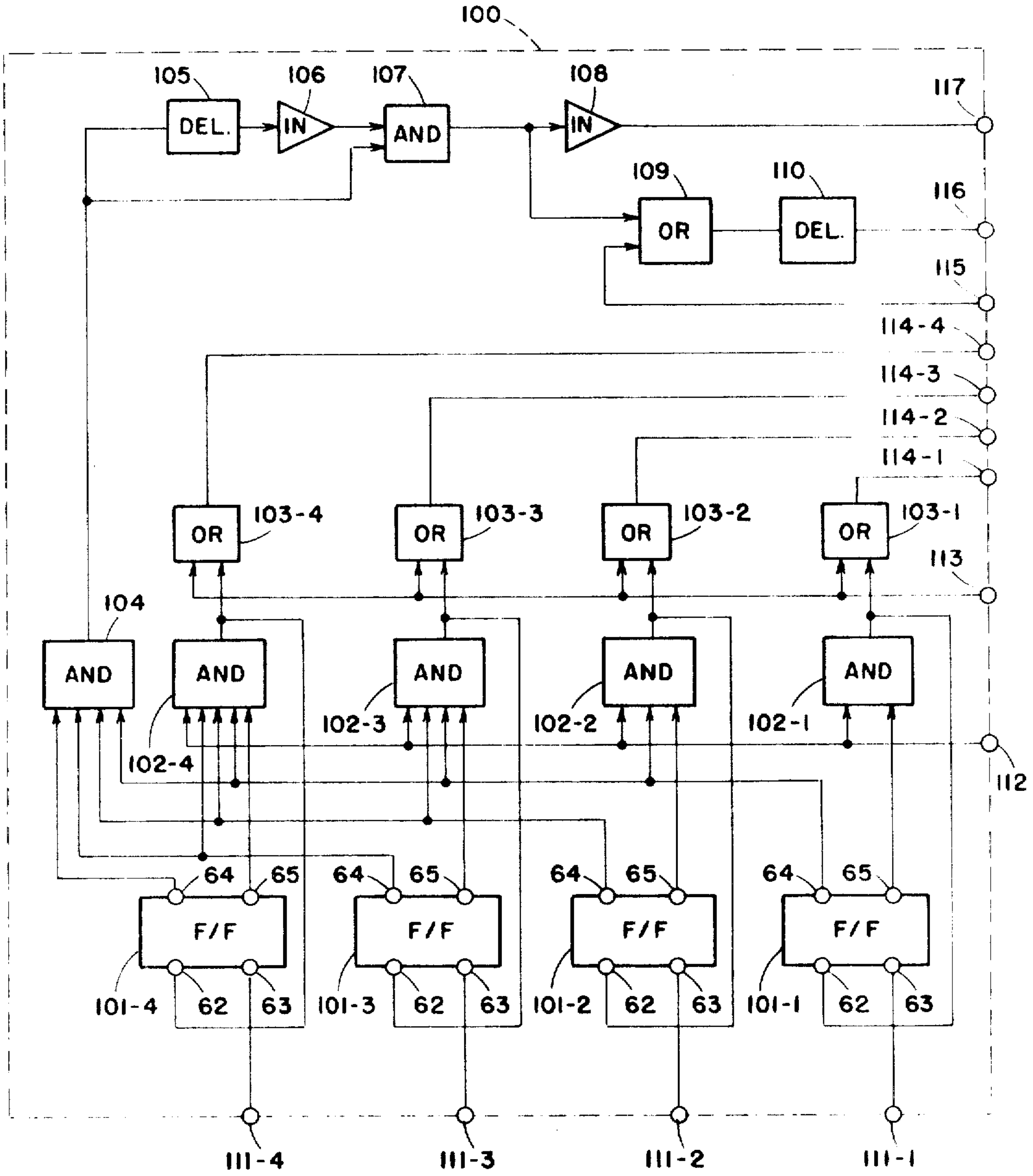
FIG. 3 is a box diagram of a logic circuit usable with FIG. 1 for processing match signals in a second given direction different from the first given direction of FIG. 2.

For the present explanation, it is now assumed that match signal distributor 101 in FIG. 1, *Y*-directional multimatch processing circuit 30 in FIG. 2 and *X*-directional multimatch processing circuit 100 in FIG. 3 are interconnected as illustrated in FIG. 7. The *Y*-directional multimatch processing circuit in FIG. 2 comprises: flip-flop circuits 31's (31-1...31-4) for storing the *Y*-directional match signals fed from the output terminals 16-1...16-4 of match signals distributed in the *Y* direction by the match signal distributor in FIG. 1 via terminals 35-1...35-4 in FIG. 2, AND gate 39 for generating an end signal applied to terminal 36 for indicating the conclusion of the operation of the *Y* direction multimatch processing circuit, OR gates 33's (33-1...33-4) for applying control signals to the terminals 20's (20-1...20-4) shown in FIG. 1 after the match signals are processed, terminals 40's (40-1...40-4) respectively connected with the output terminals of OR gates 33' s (33-1..33-4) terminal 38 for applying a *Y*-directional multimatch processing signal to control the multimatch processing, terminal 37 for applying a *Y* control signal to control the OR gates 33's respectively.

The *X*-directional multimatch processing circuit in FIG. 3 comprises: terminals 111's (111-1...111-4) for receiving match signals distributed in the *X* direction from the output terminals 18's in FIG. 1, flip-flop circuits 101's (101-1...101-4) for storing the *X*-directional match signals received from the terminals 111's, AND gates 102's (102-1...102-4) for performing the multimatch processing, OR gates 103's (103-1...103-4) for respectively supplying the control signals to the terminals 19's in FIG. 1 after the *X*-directional multimatches are processed, terminals 114's (114-1...114-4) connected respectively to the outputs of the OR gates 103's, terminal 112 for applying an *X*-directional multimatch processing signal, terminal 113 for applying an *X* control signal via OR gate 101*a* in FIG. 7 to control the OR gates 103's, AND gate 104 for generating an end signal indicating the conclusion of the *X*-directional multimatch processing as mentioned below, terminal 117 for applying a *Y*-directional multimatch processing signal to terminal 38 of the *Y*-directional multimatch processing circuit in FIG. 2, a delay unit 105 for applying a signal to terminal 117, a circuit comprising inverter 106, AND gate 107 and inverter 108, a circuit comprising OR gate 109 and delay unit 110 for applying an *X* set pulse via terminal 116 to terminal 17 of the match signal distributor in FIG. 1, terminal 116 connected to the output side of the delay unit 110, and terminal 115 for applying the *Y* set signal to the other side input end of the OR gate 109.

The interconnection of the circuits of FIGS. 1, 2 and 3 as shown in FIG. 7 are further explained as follows: terminals 16-1 . . . 16-4 in FIG. 1 are respectively connected to terminals 35-1 . . . 35-4 in FIG. 2, terminals 18-1 . . . 18-4 in FIG. 1 to the respective terminals 111-1 . . . 111-4 in FIG. 3, terminals 40-1 . . . 40-4 in FIG. 2 to the respective terminals 20-1 . . . 20-4 in FIG. 1, terminals 114-1 . . . 114-4 in FIG. 3 to the respective terminals 19-1 . . . 19-4 in FIG. 1, and terminal 116 in FIG. 3 to terminal 17 in FIG. 1.

Figure 4:
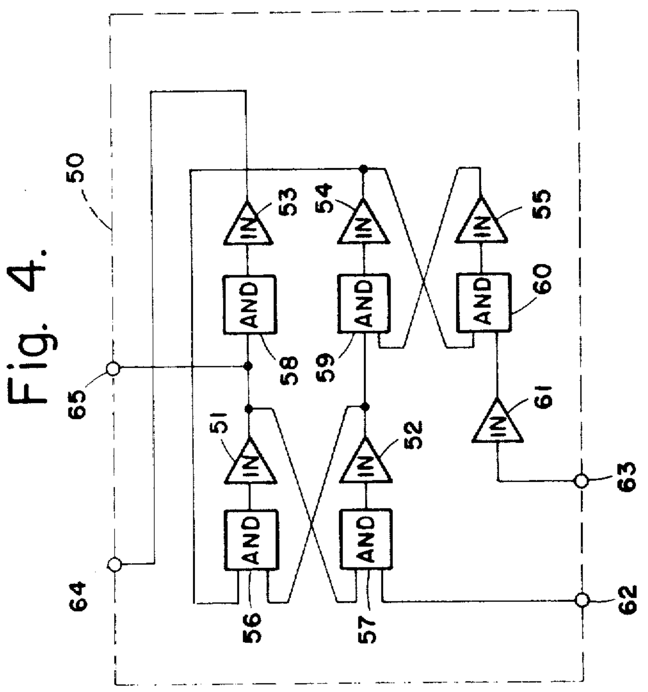
FIG. 4 is a box diagram of a logic flip-flop circuit usable in FIGS. 2 and 3.

Flip-flop circuit 50 shown in FIG. 4 and used in FIGS. 2 and 3 comprises: inverters 51, 52, 53, 54, 55 and 61, and AND gates 56, 57, 58, 59 and 60. The operation of the flip-flop is explained by referring to waveforms in FIG. 5 for which it is assumed that a state of 1 corresponds, for instance, to a level of +2 volts and a state of 0 corresponds to a normal state. Terminal 62 is used for applying a reset signal and terminal 63 is used for applying the set signal to set the flip-flop in correspondence to the match signal. If the outputs of inverters 51 and 53 are respectively in a state of 0 and 1 and if the state of terminal 63 is switched from state 0 to state 1 during the period $t_1$—$t_2$ in FIG. 5, then the output of inverter 61 is switched from state 1 to state 0 and the output of the AND gate 60 from state 1 to state 0, and the output of inverter 55 becomes state 1. During this period of time, since the state of terminal 62 is held at state 0, the outputs of AND gate 57 and inverter 52 are respectively in a state of 0 and 1. Hence, the outputs of AND gate 59 and inverter 54 become states 1 and 0, respectively. Further, owing to the state 0 output of inverter 54, the outputs of AND gate 56 and inverter 51 become states 0 and 1, respectively. Then consider the output states of the inverters 51 and 53 when the pulse 71 in FIG. 5 which had been applied during the period $t_1$—$t_2$ to the terminal 63 in FIG. 4 has been concluded. Since the state of the terminal 63 is changed from 1 to 0, the output of the inverter 61 is changed from state 0 to state 1. However, owing to the state 0 output of inverter 54, the output of AND gate 60 does not change. It means that the outputs of the inverters 55 and 54 do not change.

Figure 5:
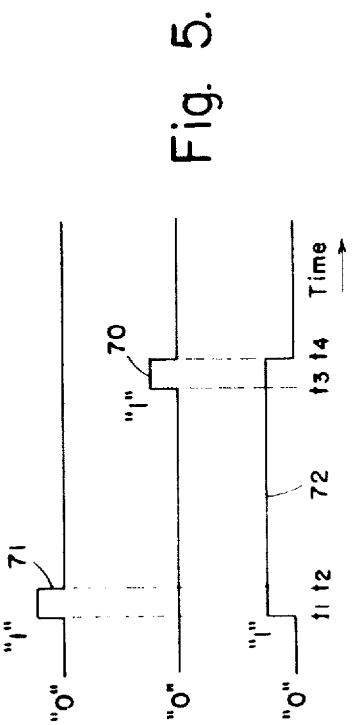
FIG. 5 is a family of waveforms for explaining the operation of FIG. 4.

Consider a case where a pulse indicated by a waveform 70 in FIG. 5 is applied to terminal 62 in FIG. 4. Since the state of terminal 62 is changed from 0 to 1 during the period $t_3$—$t_4$, the outputs of AND gate 57 and the inverter 52 become respectively 1 and 0 because of the logic product of the output state 1 of inverter 51 and state 1 of terminal 62. Owing to the output state 0 of inverter 52, the outputs of AND gate 59 and inverter 54 become states 0 and 1, respectively, so that the outputs of AND gate 60 and inverter 55 are states 1 and 0, respectively. However, even when the output of the inverter 54 is changed from state 0 to state 1, since the output of inverter 52 is playing a role of keeping the inverter 51 in state 1, and even when a pulse is applied to terminal 62 during the period $t_3$—$t_4$ in FIG. 5, terminal 65 is held in state 1 and terminal 64 in state 0. Further, when terminal 62 is changed from state 1 to state 0 at the time $t_4$, the output of AND gate 57 is changed from state 1 to state 0. Consequently, the output of inverter 51 is switched from state 1 to state 0, and the output of inverter 53 is switched from state 0 to state 1.

It is therefore understood as shown in waveform 72 in FIG. 5 that the output of inverter 51 is set to state 1 at the leading edge of the pulse applied to terminal 63 and is reset to state 0 at the trailing edge of the pulse applied to the terminal 62. As is obvious from the above explanation, the flip-flop circuit used in the present invention has a feature of not being changed in the state of output terminals 64 and 65 during the period the reset pulse is being applied.

An explanation is now given with reference to the operational mode of the associative memory shown in FIG. 7 and suitable for the multimatch processing system conforming to the present invention. In the associative memory, when a search operation is not being carried out therein, it is arranged that match-signal-output-leads provided in correspondence to the respective words of the associative memory take a matched state. That is to say, in a normal state (a search operation is not being performed), the terminals 21's (21–1...21bq16) in FIG. 1 are placed in a state of being applied with match signals. Further, when the search operation is being performed in the associative memory, the output leads 21's—for transferring match signals for words which match the search signals—are held in a matched state, and the output leads 21'5—used for transferring the mismatch signals for words which do not match the search signals—are placed in a mismatch state (i.e., in a state different from the match state). Therefore, when the search operation is concluded, all of the output leads 21's are placed in the match state.

Consider the operation of the *Y*-directional multimatch processing circuit in FIG. 2. The multimatch signals distributed by the multimatch distributor in FIG. 1 are fed to the terminals 63's of the flip-flop circuits in FIG. 2. When, for instance, the flip-flop circuit 31–1 is set by a match signal distributed in the *Y* direction, the state of terminals 65 and 64 thereof become 1 and 0, respectively. However, when the match signal distributed in the *Y* direction is not applied to flip-flop circuits 31–1, the initial state is assumed to be selected so that the terminals 65 and 64 are held in states of 0 and 1, respectively. For convenience of explanation, it is designated here that a state S is effective when terminals 65 and 64 of the flip-flop circuit are respectively in states of 1 and 0, and a state R is effective when terminals 65 and 64 are respectively in states of 0 and 1. Thus, a flip-flop circuit takes a state S only when it stores a match signal.

Assume that flip-flop circuits 31–1...31–4 are respectively in states of S, R, S and R, and terminal 38 is in state 1. Then, change the 1 state of the terminal 38 to 0, and further the 0 state back to the 1 state. When the terminal 38 is fed with a first negative direction pulse, since the output of AND gate 32–1 is changed from state 1 to state 0, owing to the latter negative direction pulse, the flip-flop circuit is switched from the state S to the state R at the leading edge of the latter negative direction pulse. At this time, the respective states of the flip-flop circuits 31's become R, R, S and R. Hence, when the first negative direction pulse is concluded, the output of AND gate 32–3 is maintained at a state 1 until the second negative direction pulse is applied to terminal 38, because of state 1 of each terminal 64 of flip-flop circuits 31–1 and 31–2 and terminal 65 of flip-flop circuit 31–3. Next, when the second negative direction pulse is applied to terminal 38, since all of the flip-flop circuits 31—s become a state of R, the output of AND gate 39 is changed from state 0 to state 1. Hence, the detection of terminal 36 which has changed from state 0 to state 1 indicates that the multimatch processing of the *Y*-directional multimatch processing circuit is concluded.

The object of performing the multimatch processing in a system where the circuits of FIGS. 1, 2 and 3 are interconnected, is as described previously to offer an economical multimatch processing system in which the multimatch processing circuit has been simplified by distributing the match signals given to the terminals 21's shown in FIG. 1 to the directions of *X* and *Y* in sequence. Thus, the object is to perform the multimatch processing of an associative memory having $n^2$ words by means of a system comprising $2n$ flip-flop circuits. In other words, the object of the system herein is to indicate the positions of matched words by means of flip-flop circuits effectively connected in *X* and *Y* directions.

Figure 6:
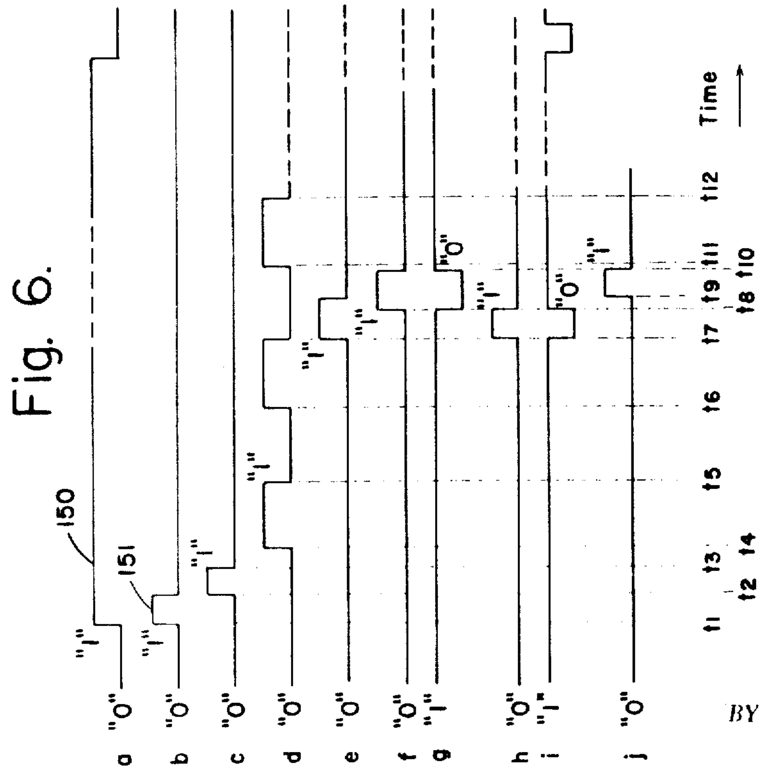
FIG. 6 is a family of waveforms for explaining the operation of FIGS. 1, 2 and 3.

An explanation is now given with reference to the waveforms in FIG. 6 and the interconnection of the circuits in FIGS. 1, 2 and 3 as illustrated in FIG. 7. Waveform 150 indicates a search signal has been given to the associative memory. With the preparation of waveform 151 at the leading edge of the waveform 150, a multimatch processing operation is stated in the system of FIG. 7. A pulse indicated by waveform 151 is simultaneously applied to terminal 15 in FIGS. 1 and 7, terminal 37 in FIGS. 2 and 7, and terminal 115 in FIGS. 3 and 7. At this time, the *X* control signal generated via OR gate 101a is applied to terminal 113. Owing to the *Y* control signal at terminal 37, all terminals 40's are in state 1 during the time period $t_1$—$t_2$; and owing to the *X* control signal at terminal 113, all terminals 114's are in state 1 during the time period $t_1$—$t_2$. This means that all terminals 19's and 20's in FIGS. 1 and 7 are in state 1 during the time period $t_1$—$t_2$.

Accordingly, the match signals for respective words of the associative memory (comprising 16 words for the present explanation) during the time period $t_1$—$t_2$ are obtained respectively via the terminals 21's as the outputs of the AND gates 10's. When a match signal is obtained at any one of terminals 21–1 . . . 21–4 (in case any of these terminals is in state 1), the output of OR gate 11–1 is state 1. Further, owing to the *Y* set pulse applied to terminal 15 in FIGS. 1 and 7, the output of AND gates 12–1, viz, the state of terminal 16–1, is 1 during the time period $t_1$—$t_2$. In a similar manner, when a match signal is obtained at any one of terminals 21–5...21–8, the output of AND gate 12–2, viz, the state of terminal 16–2, is 1; when match signal is obtained at any one of terminals 21–9...21—3, viz, the state of terminal 16–3, is 1, and when a match signal is obtained at any one of terminals 21–13 . 21–16, the output of AND gate 12–4, viz, the state of terminal 16–4, is 1. The flip-flop circuits 31's in FIG. 2 respond respectively to the signals of the 1 states obtained at the terminals 16's in FIGS. 1 and 7.

For this explanation, it is assumed here that all flip-flop circuits 31's in FIG. 2 and all flip-flop circuits 101's in FIG. 3 are in a state of R at an initial stage of system operation. If flip-flop circuit 31–1 in FIG. 2 is set in the state S, viz, the terminal 65 is set at the state 1, during the time period $t_1$—$t_7$, since terminal 38 in FIGS. 2 and 7 is held at the state 1 during the time period $t_1$—$t_7$ as shown with a waveform *i* in FIG. 6, the output of AND gate 32–1 in FIG. 2 becomes the state 1. Further in this case, even though the flip-flop circuits 31–2, 31–3 and 31–4 in FIG. 2 are in any state, the outputs of AND gates 32–2, 32–3 and 32–4 are the state 0. Therefore, it is assured that only terminal 40–1 in FIGS. 2 and 7 is in the state 1 during the time period $t_1$— $t_7$. Further during the time period $t_1$—$t_7$, is assured that terminal 20–1 in FIGS. 1 and 7 is held at the state 1 and that terminals 20–2, 20–3 and 20–4 are in the state 0. At this time, terminal 115 in FIGS. 3 and 7 is fed with a pulse having a waveform *b*, and the delay time of the delay unit 110 has been selected so that the *X* set pulse indicated by waveform *c* is obtained at terminal 116 in FIGS. 3 and 7 via OR gate 109 and delay unit 110 in sequence. That is, if the delay time of delay unit 110 is assumed to be $T_1$, the leading edge of pulse waveform *c* becomes $t_1+T_1$. In the case shown in FIG. 6, $t_1+T_1$ is selected to be equal to the time $t_2$. Further, if the pulse obtained at the terminal 116 in FIG. 3 is applied to one input of OR gate 101*a*, the *X* control signal is generated thereby and applied to the terminal 113. Owing to the *X* control signal applied to the terminal 113, it is assured that all the terminals 19's in FIGS. 1 and 7 become state 1 during the time period $t_2$—$t_3$. Pulses indicated by waveforms *b* and *c* in FIG. 6 are applied to terminal 113 via OR gate 101*a* as shown in FIG. 7.

When a pulse indicated by waveform *c* is applied to terminal 17 in FIGS. 1 and 7 during the time period $t_2$—$t_3$, the output states of AND gate 14–1...14–4 are stored in the flip-flop circuits 101's, respectively, in FIG. 3. Further, when an *X*-directional multimatch processing signal indicated by waveform *d* in FIG. 6 is applied to terminal 112 in FIGS. 3 and 7 during the time period $t_4$—$t_5$, any one of the terminals 114's in FIGS. 3 and 7 become state 1 (flip-flop 31–1 in FIG. 2 is in the state S) in conformity with the state of the corresponding flip-flop circuit 101 in FIG. 3. If the flip-flops 101–1...101–4 in FIG. 3 are assumed to be set in states of R, S, R and S, respectively, the terminal 114–2 in FIG. 3 becomes a state 1 during the time period $t_4$—$t_5$, while all of the remaining terminals 114–1, 114–3 and 114–4 become a state 0. Since flip-flop circuit 31–1 is still in the state S during the time period $t_4$—$t_5$, only AND gate 10–2 in FIG. 1 becomes a state 1. Since any of the AND gate 10's in FIG. 1 may be in the state 1 during the time period $t_4$—$t_5$, the first drive for a matched word can be performed by selecting the word which corresponds to the 1 state of the AND gates 10's. Next, after the first *X*-directional multimatch processing signal applied to the terminal 112 in FIG. 3 has been concluded at the time $t_5$, flip-flop circuit 101–2 in FIG. 3 is switched from the state S to the state R. Therefore, when a second *X*-directional multimatch processing signal is applied to terminal 112 in FIGS. 3 and 7 during the time period $t_6$—$t_7$, terminal 114–4 in FIG. 3 becomes a state 1 in correspondence to the S state of flip-flop circuit 101–4. Accordingly, the output of only AND gate 10–4 in FIG. 1 becomes a state 1 during the time period $t_6$—$t_7$. Hence, during the time period $t_6$—$t_7$, viz, during the time period of the application of the second *X*-directional multimatch processing signal, the second matched word is chosen by selecting a word in correspondence to the output 1 of AND gate 10–4.

When a the second *X*-directional multimatch processing signal ends at the time $t_7$, the selection of the matched word belonging to flip-flop circuit 31–1 in FIG. 2 is concluded. That is to say, since all of the flip-flops 101's in FIG. 3 become a state of R at the time $t_7$, the output of the AND gate 104 in FIG. 3 is changed from 0 to 1 at the time $t_7$ (refer to a waveform *e* in FIG. 6). The output of AND gate 104 in FIG. 3 is led to the inputs of delay unit 105 and AND gate 107 in FIG. 3. If the delay time of the delay unit 105 is assumed to be $T_2$, the output of delay unit 105 becomes such as indicated by waveform *f*, providing time $t_8$ is selected to be $t_7+T_2$. Accordingly, the output of inverter 106 becomes waveform *g*. In addition, the output of AND gate 107 becomes waveform *h*. Now, a pulse (a *Y*-directional multimatch processing signal) like waveform *i* is obtained at the terminal 117—the output side of inverter 108—in FIG. 3, and applied to terminal 38 in FIGS. 2 and 7.

While the terminal 38 in FIGS. 2 and 7 is being forced to the state 0 during the time period $t_7$—$t_8$, flip-flop circuit 31–1 in FIG. 2 is switched from the state of S to the state R. If the flip-flop circuits 31–2, 31–3 and 31–4 are assumed to be in the state of R, S and R, respectively, terminal 40–3 in FIG. 2 becomes state 1 in correspondence to the state S of flip-flop circuit 31–3, during the time period from $t_8$ to the time when terminal 38 in FIGS. 2 and 7 is switched from state 1 to state 0. Further, since the output of AND gate 107 in FIG. 3 is applied to OR gate 109 in FIG. 3, a pulse which becomes 1 during the time period $t_9$–$t_{10}$ is obtained at terminal 116 in FIGS. 3 and 7 (refer to waveform *j* in FIG. 6), providing that time $t_9$ is $t7+T_1$ and time $t_8+T_1$. Accordingly, the output states of AND gates 10–9...10—3 in FIG.
2 are stored in the respective flip-flop circuits 101's in FIG. 3. Next, when the *X*-directional multimatch processing signal (refer to waveform *d* in FIG. 6) is applied to the terminal 112 in FIGS. 3 and 7 during the time period $t_{11}$—$t_{12}$, the first matched word belonging to the flip-flop circuit 31–3 will be selected during the period $t_{11}$—$t_{12}$. By repeating the above-described operation, all matched words will be selected from the *Y* and *X* directions in sequence.

When the selection of the final matched word is completed, all of the flip-flop circuits 31—s in FIG. 2 are reset to the state of R owing to the *Y*-directional multimatch processing signal obtained from terminal 117 in FIG. 3. As a result, the output of AND gate 39 in FIG. 2, viz, the state of the terminal 36 in FIGS. 2 and 7, is changed from 0 to 1, so that the search operation of the associative memory can be made to finish by detecting the variation of the state at terminal 36 and thereby to finish the multimatch processing operation. The match signals are thus recorded in the flip-flop circuits of the respective *Y* and *X* directions in accordance with .he occurrences and positions of the match signals of the memory search signals.

The effect of the present invention is that the required number of flip-flop circuits is less than the number of words supplied by the associative memory. Thus, an economical multimatch processing system is materialized. As hereinbefore mentioned, if *m* flip-flop circuits are provided in an *X* direction and *n* flip-flop circuits are provided in a *Y* direction, the system herein described enables the performance of multimatch processing of an associative memory having *mxn* words. For instance, if $n=64$ and $m=64$, then it is possible to perform the multimatch processing of an associative memory having 4,096 words. It is therefore obvious that as the number of words of the associative memory becomes large, the ratio between the number of flip-flop circuits required for multimatch processing and the number of such words can be made small. As the number of AND gates 12–1...12–4 and 14–1 . . . 14–4 in FIG. 1 is equal to the number of flip-flop circuits 31–1 . . . 31–4 and 101–1 . . . 101– in FIGS. 2 and 3, respectively, the relationship between the numbers of flip-flop circuits and memory words as just mentioned is likewise true regarding the latter words and the last-mentioned AND gates. This rrlationship is also true between the flip-flop circuits and OR gates 11–1 . . . 11–4 and 13–1 . . . 13–4 in FIG. 1 and therefore between the latter OR gates and the number of memory words. As the number of AND gates 10–1 . . . 10–16 is equal to the number of memory words, the foregoing relationship also applies to the AND gates 12–1...12–4 and 14–1...14–4 or OR gates 11–1...11–4 and 13–1...13–4, i.e., *mxn* AND gates 10–1...10–*m* AND gates 12-—1...12–4 (or OR gates 11–1...11–4) and *n* and AND gates 14–1...14—1...13–4 OR gates). The system above described has the additional advantage of employing a priority circuit of a simple design.

Although the present invention is herein described regarding one specific embodiment, it is evident that the multimatch processing system based on the present invention can be transformed in several ways. For instance, during the period when the multimatch processing is being performed as shown with the waveform *a* in FIG. 6, there is no need of keeping the associative memory in a searching state. However, in case of setting the new contents in the flip-flop circuits 101's in FIG. 3, the selection can be performed by temporarialy putting the associative memory in a searching state, keeping the contents of the flip-flops 31's in FIG. 2 intact. Moreover, although the present invention is described about words projected to the two directions of *X* and *Y*, is it is also possible to project words into the three directions of *X*, *Y* and *Z* by adding a different direction. Thus, it is obvious that the multimatch processing is economically achieved by projecting the words into two or more different directions.

I claim:

1. A multimatch system for processing the results of matching signals supplied by a memory also supplying operating control signals, comprising:

- means for distributing said memory signals, including a plurality of terminals, each supplied with one of said memory signals;
- a plurality of first AND gates, each having an output and a plurality of inputs, one input of each gate connected to a respective one of said terminals, said gate outputs arranged in pluralities of first and second groups of signal transmission paths, each of said first path groups having a first preselected number of paths connected to a corresponding number of said outputs of said first AND gates, each of said second path groups having a second preselected number of paths equal to said first preselected number of paths in each of said first path groups, each of said second path groups having each path of each group connected to a corresponding path in a different one of said first path groups;
- a plurality of second AND gates, each having an output and two inputs of which last-mentioned inputs one is coupled to one of said first signal path groups;
- a plurality of third AND gates, each including an output and two inputs of which last-mentioned inputs one is coupled to one of said second signal path groups; said first AND gates having a number eqUal to the product of the number of said second AND gates multiplied by the number of said third AND gates;
- first logic means supplying a control signal to he the second inputs of said second AND gates and coupling said second AND gate outputs to second inputs of said first AND gates included in different groups thereof; each of said last-mentioned different first AND gate groups having said outputs thereof connected to one of said first signal path groups;
- and second logic means coupling said third AND gate outputs to third inputs of said first AND gates included in a further different groups thereof, each of said last-mentioned further different first AND gate groups having said outputs thereof connected to each of said second signal path groups; second inputs of said second and third AND gates and said first and second logic means activated by said memory control signals in such predetermined manner as to record alternately in said first and second logic means the occurrences and positions of memory matching signals effective at said distributing means terminals.

2. The system according to claim 1 in which said first and second logic means are so activated by said memory control signals that a first match signal is recorded in said first logic means, a second match signal is recorded in said second logic means, and thereafter the respective match signals are alternately recorded in said first and second logic means.

3. The system according to claim 1 in which said second AND gates comprise a number *m*, said third AND gates comprise a number *n*, and said memory signals comprise a number equal to the product of *m* times *n*, where *m* and *n* are integers.

4. The system according to claim 1 in which said memory signals comprise an $n^2$ number and said second and third AND gates combined comprise a 2*n* number where *n* is an integer.

5. The system according to claim 1 in which said signal distributing means includes a plurality of OR gates each having a plurality of inputs connected to one path group of said first path groups and an output connected to said one input of one of said second second gates.

6. The system according to claim 1 in which said signal distributing means includes a plurality of OR gates, each having a plurality of inputs connected to one path group of said second path groups and an output connected to said one input of one said third AND gates.

7. The system according to claim 1 in which said signal distributing means includes a plurality of first OR gates, each having a plurality of outputs connected to one path group of said first path groups and an output connected to said one input of one of said second AND gates; and a plurality of second OR gates, each of having a plurality of inputs connected to one path group of said said second path groups and an output connected to said one input of one of said third AND gates.

8. The system according to claim 7 in which said first OR gates comprise a number *m*, said second OR gates comprise a number *n*, and said first AND gates comprise a number number equal to the product of *m* times *n*, where *m* and *n* are integers.

9. The system according to claim 1 in which said first logic means includes a plurality of flip-flop circuits, each having at least one input and one output, each of said last-mentioned circuits having said one input connected to said output of one of said second AND gates and said one output connected to said second inputs of said first AND gates included in one of said different first AND gate groups, said flip-flop circuits recording match signals effective in said second AND gate outputs.

10. The system according to claim 1 in which said second logic means includes a plurality of flip-flop circuits, each having at least one input and one output, each of said last-mentioned circuits having said one input connected to said output of one of said third AND gates and said one output connected to said third inputs of said first AND gates and said one output connected to said third inputs of said first AND gates included in one of said further different first AND groups, said flip-flop circuits recording match signals effective in said third And gates outputs.

11. The system according to claim 1 in which said first logic means includes a plurality of first flip-flop circuits, each having at least one input and one output, each of said last-mentioned circuits having said one input connected to said output of one of said second AND gates and said one output connected to said second inputs of said first AND gates included in one of said different AND gate groups, said first flip-flop circuits recording match signals effective in said second AND gate outputs; and said second logic means includes a plurality of second flip-flop circuits, each having at least one input and one output, each of said last-mentioned circuits having said one input connected to said output of one of said third AND gates and said output connected to said third inputs of said first AND gates included in one of said further different first AND gate groups, said second flip-flop circuits recording match signals effective in said third AND gate outputs.

12. The system according to claim 11 in which said first flip-flop circuits comprise an $m$ number, said second flip-flop circuits comprise an $n$ number, and said memory signals comprise a number equal to the product of $m$ times $n$, where $m$ and $n$ are integers.

13. The system according to claim 11 in which said flip-flop circuits comprise an $m$ number, said second flip-flop circuits comprise an $n$ number, and said first AND gates comprise a number equal to the product of $m$ times $n$, where $m$ and $n$ are integers.

14. The system according to claim 1 in which said first logic means comprises:

a plurality of fourth AND gates, each having an output and a plurality of inputs, one input of each of four of said last-mentioned AND gates receiving one of said memory control signals;

a plurality of first OR gates, each having an output connected to said second inputs of said first AND gates included in one of said different groups thereof, a first input connected to the output of one of said four to of said fourth AND gates, and a second input receiving one of said memory control signals;

a plurality of flip-flop circuits, each having two inputs and two outputs;

a first of said flip-flop circuits having one of said inputs thereof connected to the output o of a corresponding one of said second AND gates, a second of said inputs thereof connected to the output of a corresponding one of said four to of said fourth AND gates, a first of said outputs thereof connected to a second input of said last-mentioned one AND gate, and a second of said outputs thereof connected to a second input of each of second, third and fourth AND gates included in said four of said fourth AND gates and to a first input of a fifth of said fourth AND gates;

a second of said flip-flop circuits having one of said inputs thereof connected to the output of a corresponding one of said second AND gates, a second of said inputs thereof connected to the output of a corresponding one of said four to of said fourth AND gates, a first of said outputs thereof connected to a third input of said last-mentined one AND gate, and a second of said outputs thereof connected to a third input of each of said third and fourth AND gates included in said four of said fourth AND gates and to a second input of said fifth of said fourth AND gates;

a third of said flip-flop circuits having one of said inputs thereof connected to the output of a corresponding one of said second AND gates, a second of said inputs thereof connected to the output of a last-mentioned one of said four of said fourth AND gates, a first of said outputs thereof connected to a fourth input of said last-mentioned one AND gate, and a second of said outputs thereof connected to a fourth input of said fourth of said four of said fourth AND gates and to a third input of said fifth of said fourth AND gates; and a fourth of said flip-flop circuits having one of said inputs thereof connected to the output of a corresponding one of said second AND gates, a second of said inputs thereof connected to the output of a corresponding one of said four of said fourth AND gates, a first of said outputs thereof connected to a fifth input of said last-mentioned one AND gate, and a second of said outputs thereof connected to a fourth input of said fifth of said fourth AND gates; said fifth of said fourth AND gates having an output connected to said second logic means.

15. The system of according to claim 1 in which said second logic means comprises:

a plurality of fourth AND gates, each having an output and a plurality of inputs, one input of each of four of said last-mentioned gates receiving one of said memory control signals;

a plurality of OR gates, each having an output connected to said third inputs of said first AND gates included in each of said further different groups thereof, a first input connected to the output of one of said four of said fourth AND gates, and a second input receiving one of said memory control signals;

a plurality of flip-flop circuits, each having two inputs and two outputs;

a first of said flip-flop circuits having one of said inputs thereof connected to the output of a corresponding one of said third AND gates and a second of said inputs thereof connected to the output of a corresponding one of said four of said fourth AND gates, a first of said outputs of thereof connected to a second input of said last-mentioned one fourth AND gate and a second of said outputs thereof connected to a second input of said second, third and fourth AND gates included in said four of said fourth AND gates, said last-mentioned output also connected to a first input of a fifty of said fourth AND gates;

A second of said flip-flop circuits having one of said inputs thereof connected to the output of a corresponding one of said third AND gates, a second of said inputs thereof connected to the output of a corresponding one of said four of said fourth AND gates, a first of said outputs thereof connected to a third input of said last-mentioned one fourth AND gate, and a second of said outputs thereof connected to a third input of each of said third and fourth AND gates included in said four of said fourth AND gates, said last-mentioned output also connected to a second input of said fifty of said fourth AND gates;

a third of said flip-flop circuits having one of said inputs thereof connected to the output of a corresponding one of said third AND gates, a second of said inputs thereof connected of the output of a corresponding one of said four of said fourth AND gates, a first of said outputs thereof connected to a fourth input of said last-mentioned one of said fourth AND gate, and a second of said outputs thereof connected to a fourth input of said fourth of said four of fourth AND gates, and last-mentioned output also connected to a third input fifth of said fourth AND gates; and a fourth of said flip-flop circuits having one of said inputs thereof connected to the output of a corresponding one of said third AND gates, a second of said inputs thereof connected to the output of a corresponding one of said four or said fourth AND gates, a first of said outputs thereof connected to a fifth input of said last-mentioned one of said fourth AND gates; and a second of said outputs thereof connected to a fourth input of said fifth of said fourth AND gates;

a first delay network having an input connected to the output of said last-mentioned fifty of said fourth AND gates;

a first signal polarity inverter having an input connected to the output of said last-mentioned network;

a further AND gate having one input connected to the output of said first inverter and a second input connected to the output of said last-mentioned fifth of said fourth AND gates;

a second signal polarity inverter having an input connected to the output of said further AND gate and an output supplying a control signal to said first logic means;

a further OR gate having a first input connected to the output of said further AND gate and a second input for receiving one of said memory control signals; and a second delay network having an input connected to the input of said further OR gate and an output supplying a control signal to said distributing means and said second logic means.

16. A multimatch system for processing the results of matching signals supplied by a memory also supplying operating control signals, comprising:

means for distributing said memory signals, including a plurality of terminals, each supplied with one of said memory signals;

a plurality of first AND gates, each having an output and a plurality of inputs, one input of each gate connected to a respective one of said terminals, said gate outputs arranged in pluralities of first and second groups of signal transmission paths; each of said first path groups having a first preselected number of paths connected to a corresponding number of said outputs of said first AND gates; each of said second path groups having a second preselected number of paths equal to said first preselected number of paths in each of said first path groups; each of said second path groups having each path of each group connected to a corresponding path in a different one of said first path groups;

a plurality of first OR gates, each having an output and a plurality of inputs connected to said paths in one group of said first path groups;

a plurality of second AND gates, each having an output and two inputs of which said last-mentioned inputs one is connected to the output of a corresponding one of said first OR gates;

a plurality of second OR gates, each having an input and a plurality of inputs connected to said paths in one group of said second path groups;

a plurality of third AND gates, each having an output and two inputs of which said last-mentioned inputs one is connected to the output of one of said second OR gates;

first logic means connecting the outputs of said second AND gates to second inputs of said first AND gates, including;

a plurality of fourth AND gates, each having an output and a plurality of inputs, a plurality of third OR gates, each having an output connected to second inputs of said first AND gates having outputs arranged in one of said first path groups, a first input connected to the output of one of four of said fourth AND gates, and a second input receiving one of said memory control signals, a plurality of first flip-flop circuits, each having two inputs and two outputs, containing;

a first of said first flip-flop circuits having one of said inputs thereof connected to the output of a corresponding one of said second AND gates, a second of said inputs thereof connected to the output of a corresponding one of said four of fourth AND gates, a first of said outputs thereof connected to a second input of said last-mentioned one AND gate, and a second of said outputs thereof connected to a second input of each of a second, a third and a fourth of said four of said fourth AND gates and to a first input of a fifth of said fourth AND gates;

a second of said flip-flop circuits having one of said inputs thereof connected to the output of a corresponding one of said second gates, a second of said inputs thereof connected to the output of a corresponding one of said four of said fourth AND gates, a first of said outputs thereof connected to a third input of said last-mentioned one AND gate, and a second of said outputs thereof connected to a third input of each of said third and fourth AND gates included in said fourth of said fourth AND gates and to a second input of said fifth of said fifth of said fourth AND gates;

a third of said first flip-flop circuits having one of said inputs thereof connected to the output of a corresponding one of said second AND gates, a second of said inputs thereof connected to the output of a corresponding one of said four of said fourth AND gates, a first of said outputs thereof connected to a fourth input of said last-mentioned one AND gate, and a second of said outputs thereof connected to a fourth input of said fourth in said four of said fourth AND gates and to a third input of said fifth of said fourth AND gates;

and a fourth of said flip-flop circuits having one of said inputs thereof connected to the output of a corresponding one of said second AND gates, a second of said inputs thereof connected to the output of a corresponding one of said four of said fourth AND gates, a first of said outputs thereof connected to a fifth input of said last-mentioned one AND gate, and a second of said outputs thereof connected to a fourth input of said input of said fourth AND gates; said output of said last-mentioned fifty of said fourth AND gates connected to second inputs of said second AND gates; and second logic means connecting the outputs of said third AND gates to third inputs of said first AND gates, including;

a relatively plurality of fifty and AND gates, each having an output and a plurality of inputs, one input of each of four of said fifth AND gates receiving one of said memory control signals, a plurality of fourth OR gates, each having an output connected to said third inputs of said first AND gates having outputs arranged in one of said second path groups, a first input connected to the output of said four of said fifth AND gates, a plurality of second flip-flop circuits, each having two inputs and two outputs, consisting of:

a first of said second flip-flop circuits having one of said inputs thereof connected to the output of a corresponding one of said third AND gates, a second of said inputs threrof connected to the output of a corresponding one of said four of said fifth AND gates, a first of said outputs thereof connected to a second input of said last-mentioned one of said fifth AND gates, and a second of said outputs thereof connected to a second input of each of said second, third and fourth AND gates included in said four of said fifth AND gates and to a first input of a fifth of said fifth AND gates;

a second of said second flip-flop circuits having one of said inputs connected to the output of a corresponding one of said third AND gates, a second of said inputs thereof connected to the output of a corresponding one of said for of said fifth AND gates, a first of said outputs thereof connected to a third input of said last-mentioned one of said fifth AND gates, and a second of said outputs thereof connected to a third input of each of said third and fourth AND gates included in said four of said fifth AND gates and to a second input of said fifth of said fifth AND gates;

a third of said second flip-flop circuits having one of said inputs thereof connected to the output of a corresponding one of said third AND gates, a second of said inputs thereof connected to the output of a corresponding one of said four of said fifth AND gates, a first of said output thereof connected to a fourth input of said last-mentioned one of said fifth AND gates, and a second of said outputs thereof connected to a fourth input of said fourth of said four of said fifth AND gates and to a third input of said fifth of said fifth AND gates;

and a fourth of said second flip-flop circuits having one of said inputs thereof connected to the output of a corresponding one of said third AND gates, a second of said inputs thereof connected to the output of a corresponding one of said four of said fifth AND gates, a first of said outputs thereof connected to a fifth input of said last-mentioned one of said fifth AND gates, and a second of said outputs thereof connected to a fourth input of said fifth of said fifth AND gates;

a first delay network having an input connected to the output of said last-mentioned fifth of said fifth AND gates;

a first signal polarity inverter having an input connected to the output of said last-mentioned network;

a further AND gate having one input connected to the output of said first inverter and a second input connected to the output of said last-mentioned fifth of said fifth AND gates;

a second signal polarity inverter having an input connected to the output of said further AND gate and an output supplying a control signal of first inputs of said four of said fourth AND gates;

a further OR gate having a first input connected to the output of said further AND gate and a second input receiving one of said memory control signals; and a second delay network having a n input connected to the output of said further OR gate and an output supplying a control signal to second signals to second inputs of said third AND gates and to second inputs of said fourth OR gates; said distributing means, said first logic means and said second logic means activated by said control signals in such predetermined manner as to record alternatively in said respective first and second flip-flop circuits the occurrences and positions of memory matching signals effective at said distributing means terminals.

UNITED STATES PATENT OFFICE
CERTIFICATE OF CORRECTION

Patent No. 3,568,159 Dated March 2, 1971

Inventor(s) Ryo IGARASHI

It is certified that error appears in the above-identified patent and that said Letters Patent are hereby corrected as shown below:

Column 1, line 44, after "England." insert -- ) --;
line 45, after "for", "a" should be -- the --;
line 59, "flip-flop" should be -- flip-flops --.
Column 2, line 18, delete "for", second occurrence;
line 68, delete "of the", second occurrence.
Column 3, line 72, "11-s" should be -- 11's --.
Column 5, line 60, "(21-1...21bg16)" should be --(21-1...21-16);
line 64, "21'5" should be -- 21's --.
Column 6, line 28, "31-s" should be -- 31's --;
line 52, "Stated" should be -- started --;
line 70, "gates" should be -- gate --;
line 75, delete "21-3" and insert therefor -- 21-12, the output of AND gate 12-3 --.
Column 8, line 26, "$t7{\div}T_1$" should be -- $t_7+T_1$ --;
line 27, after "time" insert -- $t_{10}$ is --;
line 28, after "10-9...", "10-3" should be -- 10-12 --, after "FIG." insert -- 1 related to flip-flop circuit 31-3 in FIG. --;
line 38, "31-s" should be -- 31's --.
line 67, "101- in FIGS." should be -- 101-4 in FIGS. --;
line 71, "rrlationship" should be -- relationship --.
Column 9, line 3, "10-m" should be -- 10-16 --; after "10-16" insert -- is equal to the product of m --;
line 4, delete "and";
line 5, delete "14-1...14-1...13-4 OR gates)." and insert therefor, -- 14-1...14-4 (or 13-1... 13-4 OR gates).--;
line 17, "temporarialy" should be -- temporarily --;
line 21, delete "is", first occurrence;
line 53, "eqUal" should be -- equal --;
line 56, delete "he".

USCOMM-DC 60376-P69
U.S. GOVERNMENT PRINTING OFFICE : 1969 O—366-334

273

UNITED STATES PATENT OFFICE
CERTIFICATE OF CORRECTION

Patent No. 3,568,159 Dated March 2, 1971

Inventor(s) Ryo IGARASHI PAGE - 2

It is certified that error appears in the above-identified patent and that said Letters Patent are hereby corrected as shown below:

Column 10, line 16, after "gates" insert a comma (,);
line 19, delete "second" first occurrence;
line 27, "outputs" should be -- inputs --;
line 30, delete "of" first occurrence;
lines 54-55, delete "and said one...first AND gates";
line 58, "And" should be -- AND --;
line 59, "gates" should be -- gate --.

Column 11, line 6, after "said" insert -- first --;
line 18, delete "first";
line 20, delete "to", second occurrence;
line 26, delete "o";
line 29, delete "to";
line 40, delete "to";
line 41, "mentined" should be -- mentioned --;
line 50, "last-mentioned" should be -- corresponding -
line 67, delete "of".

Column 12, line 5, "," (comma) should be -- ; -- (semicolon);
line 16, after "of" insert -- each of --;
line 19, "fifty" should be -- fifth --;
line 30, "fifty" should be -- fifth --;
line 34, delete "of" and insert -- to -- therefor;
line 39, "and" should be -- said --;
after "last-mentioned" insert -- one --;
line 46, "or" should be -- of --;
line 52, "fifty" should be -- fifth --.
line 66, "input" should be -- output --.

Column 13, line 31, "," (comma) should be -- ; -- (semicolon);
line 37, "," (comma" should be -- ; -- (semicolon);
line 39, ";" (semicolon) should be -- : -- (colon);
line 44, after "of", second occurrence, insert -- said --;
line 51, after "said" insert -- first --;
line 60, "fourth", first occurrence, should be -- four --.

UNITED STATES PATENT OFFICE
CERTIFICATE OF CORRECTION

Patent No. 3,568,159 Dated March 2, 1971

Inventor(s) Ryo IGARASHI PAGE - 3

It is certified that error appears in the above-identified patent and that said Letters Patent are hereby corrected as shown below:

Column 14, line 1, after "said", first occurrence, insert -- first --;
line 8, "input" should be -- fifth --;
line 9, "fifty" should be -- fifth --;
line 14, ";" (semicolon) should be -- : -- (colon);
line 15, delete "relatively";
line 15, "fifty and" should be -- fifth --;
line 18, "," (comma) should be -- ; -- (semicolon);
line 22, after "of", first occurrence, insert -- one of --;
line 23, "," (comma) should be -- ; -- (semicolon);
line 29, "threreof" should be -- thereof --;
line 42, "for" should be -- four --;
line 55, "output" should be -- outputs --.
Column 15, line 9, "of", first occurrence, should be "to".
Column 16, line 1, "a n" should be -- an --;
line 3, delete "signals to second";
line 8, "alternatively" should be -- alternately --.

Signed and sealed this 2nd day of November 1971.

(SEAL)
Attest:

EDWARD M.FLETCHER,JR.
Attesting Officer

ROBERT GOTTSCHALK
Acting Commissioner of Patents